May 22, 1951     J. J. ROHRBACH     2,554,386
SPECTACLE FRAME
Filed Nov. 15, 1947     2 Sheets-Sheet 1
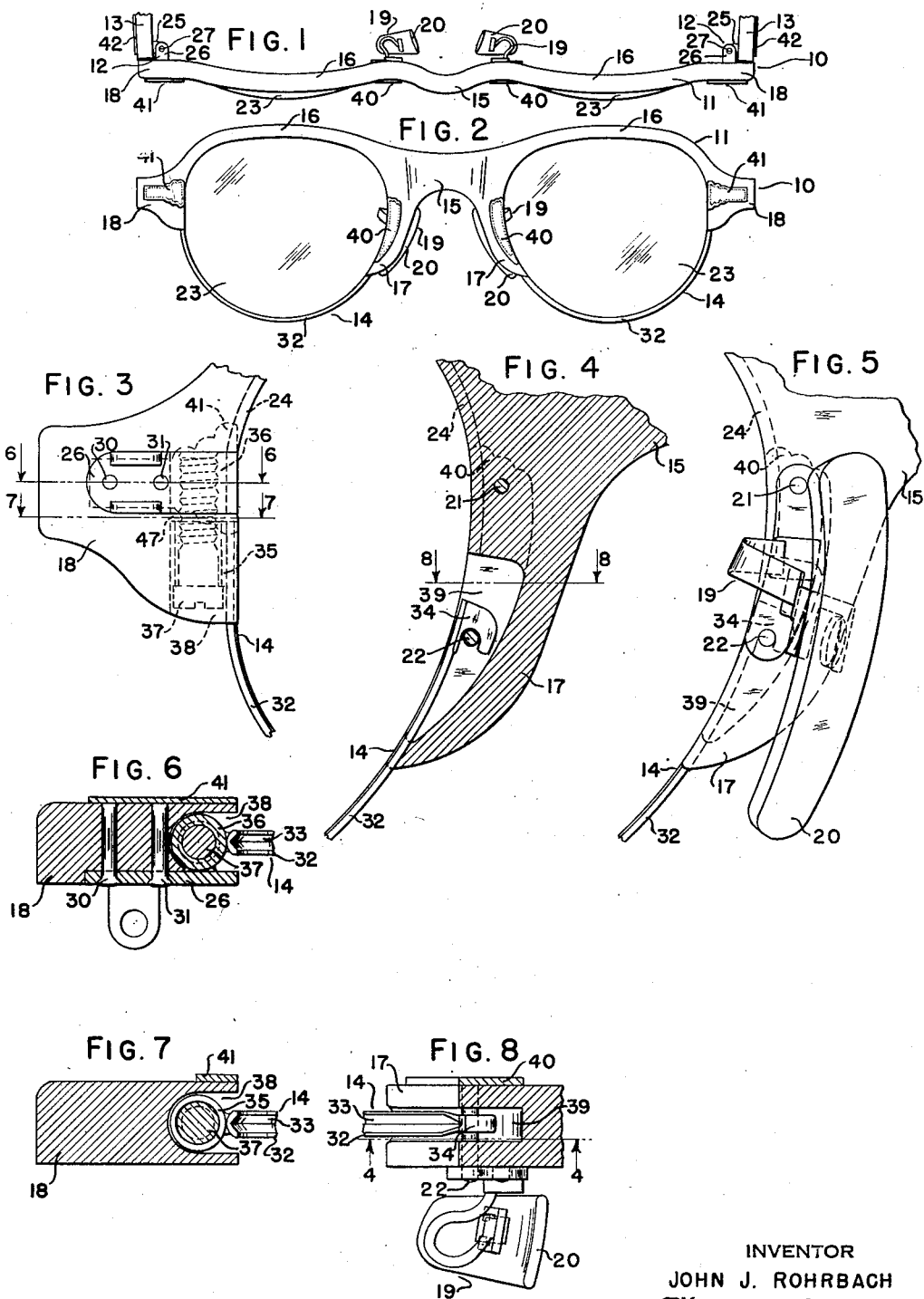
INVENTOR
JOHN J. ROHRBACH
BY
Theodore E. Simonton
ATTORNEY

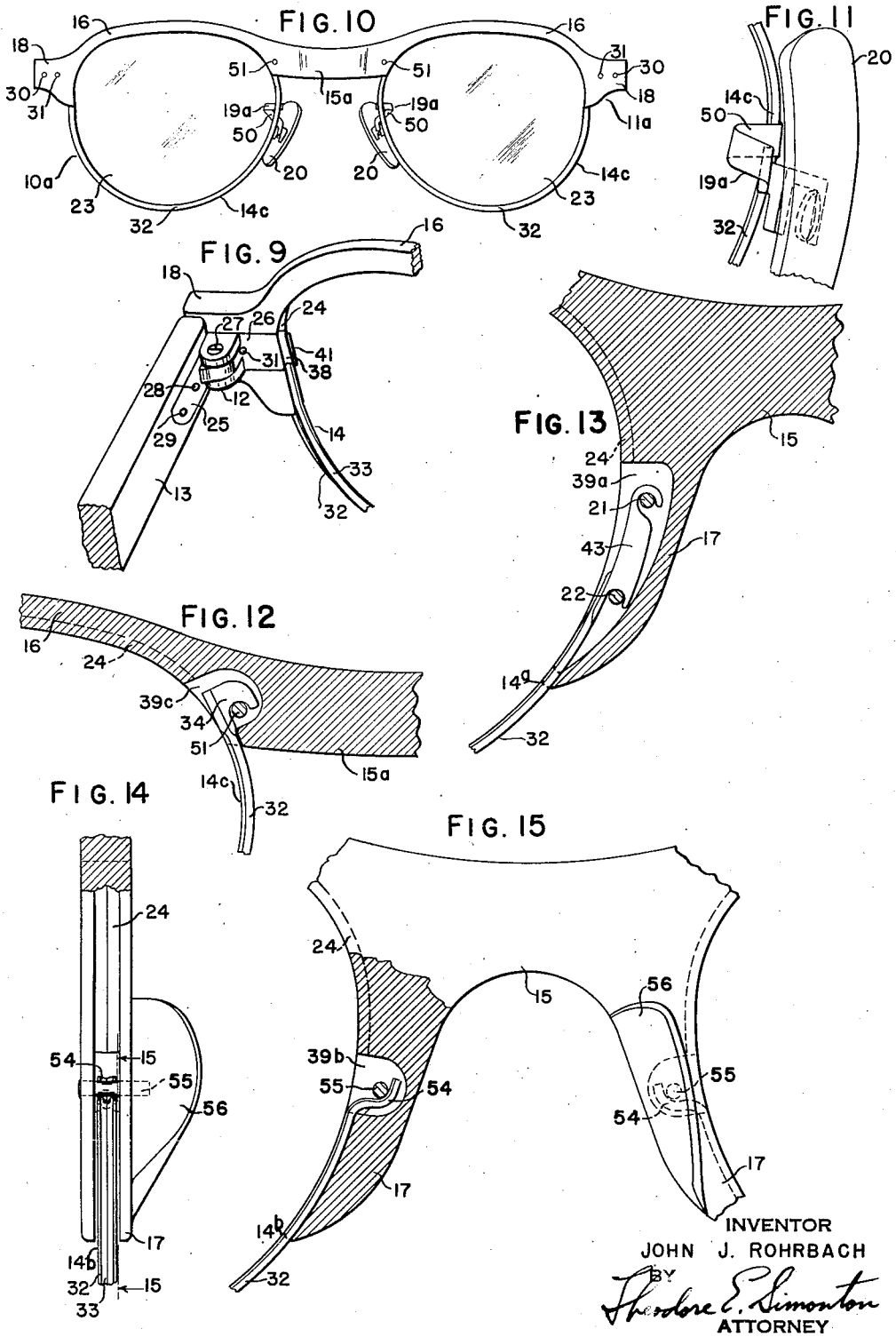

Patented May 22, 1951

2,554,386

UNITED STATES PATENT OFFICE 2,554,386

SPECTACLE FRAME

John J. Rohrbach, Rochester, N. Y., assignor to Shuron Optical Company, Inc., Geneva, N. Y., a corporation of New York Application November 15, 1947, Serial No. 786,233

2 Claims. (Cl. 88—41)

This invention relates to spectacle frames and more particularly to the class of spectacle frames wherein the lenses are secured to a top of plastic non-metallic substance by lower half-rims of metal, as disclosed in Chappell United States Patent 2,329,100, issued September 7, 1943.

Spectacles with a plastic top and metal lower half-rims of the type above-described possess numerous advantages over other types of ophthalmic mountings. The strength of a full frame and the color adaptation feature of plastic frames are combined with the full view feature of a rimless mounting in the lower visual portion. The eyebrow line or browline is accentuated resulting in a more attractive appearance. Furthermore, the combination results in a spectacle frame of a distinct and pleasing style.

Heretofore, the disadvantages of plastic frames have been accentuated in the type of frame discussed above. Xylonite or zylonite of which such plastic frames are usually made, is a cellulose nitrate plastic easily softened by heat. Hooks or other attachments anchored in a hole in the zylonite easily pull out upon distortion of the frame when subjected to heat in fitting the spectacles or in ordinary use. Ordinary screw threads are of no value since the plastics ordinarily used are of insufficient strength to form a proper thread which will withstand normal strain.

By my invention, I am enabled to attach the metal lower half-rims to the plastic top by devices which are securely anchored to the relatively soft plastic, which permit adjustment and removal of the lenses, and which make possible the use of adjustable pad arms not ordinarily found in plastic spectacles.

The principal object of my invention is to provide fastenings for both the temporal and nasal end of each metal lower half-rim by which such lower half-rim may be securely attached to the plastic top, and which will not only withstand the normal strains of use and not pull out of the plastic, but which will also be readily removable for introduction and replacement of lenses and which will not wear out even after frequent removal or adjustment.

A further object of the invention is to provide a fastening which is adjustable to compensate for minor variations in the size of the lenses used and, being readily and completely removable, to make possible the use of various sizes and shapes of lenses by substituting metal lower half-rims of various lengths.

Still further objects are to make said fastenings readily concealable and inconspicuous so as to obtain a spectacle frame which is pleasing to the eye and flattering to the appearance of the wearer; and to make possible the use of adjustable nose pad arms, which are desirable for facial adjustments and correct placement of the lens centers before the eye.

Other objects and advantages of my invention will become apparent upon reading the following specification in conjunction with the accompanying drawings, in which:

Figure 1 is a top plan view of a pair of spectacles embodying my invention, parts of the temples being broken away;

Figure 2 is a front elevation thereof;

Figure 3 is an enlarged, fragmentary, rear elevation of the temporal portion of the spectacle front showing details of the temporal fastening device;

Figure 4 is an enlarged, fragmentary section of the nasal portion on the line 4—4 of Figure 8, showing details of the nasal fastening device;

Figure 5 is an enlarged, fragmentary, rear elevation of substantially the same portion as shown in Figure 4, showing, in addition, nose pad and arm;

Figure 6 is an enlarged, fragmentary section of the portion shown in Figure 3 on the line 6—6 of Figure 3;

Figure 7 is an enlarged, fragmentary section of the portion shown in Figure 3 on line 7—7 of Figure 3;

Figure 8 is an enlarged, fragmentary section of the portion shown in Figures 4 and 5 on the line 8—8 of Figure 4 and showing nose pad and arm in top plan;

Figure 9 is an enlarged, fragmentary, perspective view of the temporal portion;

Figure 10 is a front elevation of a spectacle front showing a modification of my invention;

Figure 11 is an enlarged, fragmentary rear elevation of the nasal portion of the modified spectacle front of Figure 10;

Figure 12 is an enlarged, fragmentary sectional view of the nasal fastening device of the modified spectacle front of Figure 10;

Figure 13 is a sectional view of substantially the same portion as shown in Figure 4, showing a further modification of my invention;

Figure 14 is an enlarged, fragmentary end view of the nasal portion of a spectacle front with portions of the upper and lower rims and temporal portions broken away, showing a further modification of my invention; and Figure 15 is an enlarged, fragmentary rear elevation of the portion shown in Figure 14, partly in section on the line 15—15 of Figure 14.

The spectacles 10 shown in Figures 1 and 2 of the drawings comprise a spectacle top 11 made of zylonite or like plastic material, hereinafter sometimes called zyl, hingedly connected by temporal hinge assemblies 12 to temples 13 also made of zyl, and metal lower half-rims 14 comprising thin metal bands, sometimes called eyewires. The spectacle top 11 comprises a bridge portion 15, top arm portions 16, nose pad supporting portions 17 depending from the bridge 15, and endpiece portions 18, all preferably formed integrally from the plastic material.

A nasal assembly 19 is secured to each of the nose pad supporting portions 17, and includes an adjustable nose pad 20 and associated parts which are illustrated as being of the general type disclosed in Krapp United States Patent 2,257,966, issued October 7, 1941, but may be of any other suitable construction. Each nasal assembly 19 is attached to its respective nose pad supporting portion 17 of the top 11 by rivets 21 and 22 in the usual manner.

The lenses 23 of the spectacles 10 have bevelled edges seated in a substantially V-shaped groove 24 formed at the inner sides of the top arms 16, nose pad supporting portions 17, and endpieces 18. The upper edges of the lenses conform in contour to that of the groove 24, and the lenses are held in place against the top 11 by the lower half-rims 14.

Each temporal hinge assembly 12 comprises hinge members 25 and 26 and pintle 27. Hinge members 25 are sunk into the surface of temples 13 so that only the hinge ear projects from the surface and is fastened thereto in the usual manner by rivets 28 and 29, as shown in Figure 9. Hinge members 26 are sunk into the surface of endpieces 18 and fastened thereto in like manner by rivets 30 and 31, as shown in Figure 6. Pintle 27 joins and fastens hinge members 25 and 26 in the usual manner.

The lower half-rims 14 each comprise lens retaining portions 32 of light-guage flexible metal of substantially the width of the thickness of lenses 23, having an interior grooved surface 33, substantially V-shaped in section. Hook-shaped nasal fastenings 34 (Figures 4 and 8) of metal of less width than the lens retaining portion 32, are formed integrally with or fastened securely to said portions 32, as by soldering; and temporal fastening devices 35 (Figures 3 and 7) are also securely fastened, as by soldering, to lens retaining portions 32. The fasteners 35 are short, hollow metal cylinders of outside diameter appreciably less than the thickness of endpieces 18 of the top 11. Metal cylinders 36 of substantially the same size as the cylinders 35 (Figures 3 and 6) are securely fastened, as by soldering, to the inner surface of hinge members 26. The cylinders 36 are interiorly threaded to receive lens retaining or clamping screws 37 which pass through the hollow cylinders 35. The temporal fastening devices 35 and cylinders 36 are contained in the slots or grooves 38 along the inner edge of endpieces 18 (Figures 3, 6, and 7). There are similar slots or grooves 39 (Figures 4, 5, and 8) along the inner edge of each nose pad supporting portion 17 of the top 11, which contain the nasal fastenings 34 of the lower half-rims 14 as they are hooked over rivet 22.

It will be apparent that, when lenses 23 are inserted, nasal fastenings 34 hooked over rivets 22, and temporal fastening devices 35 securely fastened to cylinders 36 by screws 37, the lenses will be firmly held in place by grooved surfaces 33 of the lower half-rims 14 and grooves 24 of the top 11. As screw 37 is tightened, the lower half-rim 14 will conform in contour to the lower half of the lens perimeter. Since the bevelled edge of lens 23 is forced into groove 24 of the top 11 and into groove 33 of the lower half-rim 14, the lens will be held firmly in place by said grooves along the entire length of each groove. At the temporal and nasal sides of the lens respectively where there is a small portion of the lens edge not in contact with grooves 24 or 33, strength and rigidity are imparted by screw 37 in cooperation with cylinders 35 and 36 and by the aligning action of slot 39 as it contains the nasal end of lower half-rim 14.

The lower half-rims 14 need not be accurately shaped to the outline of the lenses 23 as they conform themselves to minor variations in the lenses when they are fastened in place as above described. It will also be apparent that the fastening devices above described are securely anchored in place by rivets 21 and 22, 30 and 31 in the zyl portions, and will not pull loose under normal stresses and strains even when the zyl is softened by subjection to heat. Furthermore, the zyl portions will not become worn away or weakened by frequent adjustments or changing of lenses because all "working" parts are of metal.

In the construction as above described, all exterior rivet heads and, in case transparent zyl is used, all fastening devices, may be concealed by the use of opaque plastic or metal placques 40, 41, and 42 as shown. When metal placques are used, the outer ends or heads of rivets 21, 22, 28, 29, 30, and 31 may be securely fastened to said placques, as by soldering. When plastic placques are used to cover the rivet heads, they may be secured to the plastic top or temples by cementing with any suitable plastic cement, or by softening with a plastic solvent, such as acetone, and fusing them on by pressure. Such placques may be used to enhance the decorative scheme of the spectacles by shaping them attractively. Plastic placques may be colored to contrast or blend with the other plastic parts and metal placques may be suitably etched or engraved.

Minor variations in contour and size of the lens may be compensated for by adjustment of screw 37. Referring to Figure 3, it will be seen that, with the particular lens illustrated, the cylindrical fastener 35 does not abut the cylindrical portion 36 of the hinge member 26 when the clamping screw 37 is fully tightened. The length of lower half-rim 14 is such that when screw 37 is tightened firmly in cylindrical portion 36, lens 23 is firmly seated in grooves 24 and 33 and there is an appreciable space as at 47 between cylinders 35 and 36. This space 47 permits minor variations in the contour or size of the lens without increasing or decreasing the firmness with which lens 23 is held in place in grooves 24 and 33. If the lens is slightly oversize, the space 47 is increased slightly; and if the lens is slightly undersize, the space 47 is decreased accordingly. Should it be desired to substitute lenses of substantially different lower contour, such substitution may be cheaply and easily made by the use of lower half-rims of appropriate lengths.

Figures 10, 11 and 12 illustrate a modification of the invention in which spectacle top 11a of spectacle 10a is formed with the modified bridge 15a similar to bridge 15 except that the dependent nose pad supporting portions 17 are omitted. The pad arm 50 of the nasal assembly 19a is attached directly, as by soldering, to the metal lens retaining portion 32 of the lower half-rim 14c. Lower half-rim 14c, longer than half-rim 14, is fastened directly to rivet 51 in bridge 15a by nasal fastening 34, as best shown in Figure 12. Fastening 34 is contained within slot 39c along the edge of bridge 15a adjacent to the lens 23. The modification of Figure 10 has an important advantage in that the omission of nose pad supporting portions 17 permits a narrower distance between lenses for a given adjustment of the nose pads 20, that is, allows the use of larger lenses for a particular patient than would be possible with the spectacles of Figures 1 and 9.

It will also be noted that placque 41 has been omitted from Figure 10, leaving the heads of rivets 30 and 31 exposed. Rivets 51 are also shown as exposed. It is to be understood, however, that these rivets may be covered by a placque or placques similar to placque 41 concealing rivets 30 and 31 in Figures 2 and 3.

Figure 13 illustrates a modification of the spectacle frame of Figures 1 to 9, in which nasal fastening 43 of the lower half-rim 14a is shaped with a double hook, thus engaging rivet 21 as well as rivet 22 for increased strength and rigidity. Slot 39a is of increased length to accommodate the longer nasal fastening 43.

Figures 14 and 15 illustrate a further modification of the invention in which nasal fastening 54 is a half loop formed at the nasal end of lower half-rim 14b and engages rivet 55, which is merely an anchoring rivet and serves no other purpose since nose pad 56 is integrally formed on nose pad supporting portion 17 of the spectacle top 11. It will be noted that slot 39b may be considerably smaller than slot 39 of Figure 4.

Although I have described my invention in detail and therefore utilized certain specific terms and language herein, it is to be understood that the present disclosure is illustrative, rather than restrictive, and that changes and modifications may be resorted to without departing from the spirit or scope of the claims appended hereto.

I claim:

1. A spectacle frame for a pair of lenses and of the type having a bridge, a plastic top arm for each lens shaped to mate with and embrace the upper portion only of the perimeter of the lens, a plastic temple endpiece integral with and extending outward from the temporal end of each top arm, temples hinged to said endpieces, and securing means for attaching each lens to said spectacle frame, characterized by the provision of temporal lens securing means having a wide range of adjustment and being substantialy wholly concealed within the temple endpiece, said temporal lens securing means and associated parts, for the attainment of these ends, comprising in combination, a metal hinge plate serving to support the hinged temple and secured to the rear of said endpiece by fastening means penetrating the endpiece in front of the inner surface of the hinge plate, a metal lug secured to said inner surface of the hinge plate at the lens side of said fastening means, a recess in said endpiece within which said lug is located, said endpiece having an integral depending portion extending a substantial distance below said hinge plate and lug, an open-sided slot of substantially U-shaped cross-section in the inner edge of said depending portion and extending the entire heighth of said portion with the upper end of said slot opening into said recess, a tapped hole in said lug extending axially of said slot, a second metal lug carrying temporal lens supporting means and located within said slot, said second lug being substantially shorter than said slot and being shaped for axial sliding movement within the slot, a hole in said second lug extending axially of said slot, and a screw for detachably and adjustably fastening said lugs together having its head positioned wthin said slot and bearing upon the lower end of said second lug and having its stem passing freely through said second lug hole and threaded into said first lug hole.

2. A spectacle frame for a pair of lenses and of the type having a bridge, a plastic top arm for each lens shaped to mate with and embrace the upper portion only of the perimeter of the lens, a plastic temple endpiece integral with and extending outward from the temporal end of each top arm, temples hinged to said endpieces, and securing means for attaching each lens to said spectacle frame comprising a lens-retaining metal band grooved to mate with the edge of the lens, said band being secured to the plastic top arm adjacent the nasal side thereof and serving to cradle the lower half of the lens, characterized by the provision of temporal lens securing means having a wide range of adjustment and being substantially wholly concealed within the temple endpiece, said temporal lens securing means and associated parts, for the attainment of these ends, comprising in combination, a metal hinge plate serving to support the hinged temple and secured to the rear of said endpiece by fastening means penetrating the endpiece in front of the inner surface of the hinge plate, a metal lug secured to said inner surface of the hinge plate at the lens side of said fastening means, a recess in said endpiece within which said lug is located, said endpiece having an integral depending portion extending a substantial distance below said hinge plate and lug, an open-sided slot of substantially U-shaped cross-section in the inner edge of said depending portion and extending the entire heighth of said portion with the upper end of said slot opening into said recess, a tapped hole in said lug extending axially of said slot, a second metal lug secured to said lens-retaining band adjacent the temporal end thereof and located within said slot, said second lug being substantially shorter than said slot and being shaped for axial sliding movement within the slot, a hole in said second lug extending axially of said slot, and a screw for detachably and adjustably fastening said lugs together having its head positioned within said slot and bearing upon the lower end of said second lug and having its stem passing freely through said second lug hole and threaded into said first lug hole.

JOHN J. ROHRBACH.

REFERENCES CITED

The following references are of record in the file of this patent:

UNITED STATES PATENTS

| Number | Name | Date |
|---|---|---|
| 1,996,684 | Pappert | Apr. 2, 1935 |
| 2,043,842 | Styll et al. | June 9, 1936 |
| 2,329,100 | Chappell | Sept. 7, 1943 |
| 2,372,059 | Cook | Mar. 20, 1945 |

FOREIGN PATENTS

| Number | Country | Date |
|---|---|---|
| 794,129 | France | Dec. 2, 1935 |
| 456,211 | Great Britain | Nov. 4, 1936 |
| 463,000 | Great Britain | Mar. 19, 1937 |